United States Patent
Daum et al.

[15] 3,688,784
[45] Sept. 5, 1972

[54] VEHICLE WASHING APPARATUS

[72] Inventors: John L. Daum; Ray B. Spurgin, both of Dallas, Tex.

[73] Assignee: Delta Manufacturing and Engineering Corporation, Dallas, Tex.

[22] Filed: Jan. 26, 1970

[21] Appl. No.: 5,663

[52] U.S. Cl. .............................. 134/123, 134/181
[51] Int. Cl. .............................................. B08b 3/02
[58] Field of Search .............. 134/45, 123, 180, 181

[56] References Cited

UNITED STATES PATENTS

| | | |
|---|---|---|
| 3,443,993 | 5/1969 | Lynn et al. .............. 134/181 X |
| 3,511,251 | 5/1970 | Hickman ................ 134/181 X |
| 3,370,596 | 2/1968 | Daum et al. .................. 134/45 |
| 3,460,548 | 8/1969 | Giovagnoli .............. 134/123 X |
| 3,474,801 | 10/1969 | Stotts ......................... 134/123 |
| 3,481,346 | 12/1969 | McBurnett ................... 134/45 |
| 3,502,215 | 3/1970 | Cahan ..................... 134/123 X |
| 3,537,423 | 11/1970 | Burden ..................... 134/45 X |

*Primary Examiner*—Robert L. Bleutge
*Attorney*—Walter J. Jagmin

[57] ABSTRACT

A vehicle washing apparatus having a carriage mounted for movement about a substantially oblong track and a rotatable nozzle assembly mounted on the carriage to which water under pressure is supplied, the reaction force of the water being sprayed by the nozzle assembly rotating the nozzle assembly, and a drive mechanism connected to said nozzle assembly and driven by the nozzle assembly for moving the carriage about the track.

1 Claim, 7 Drawing Figures

INVENTOR.
John L. Daum
BY Ray B. Spurgin
ATTORNEY

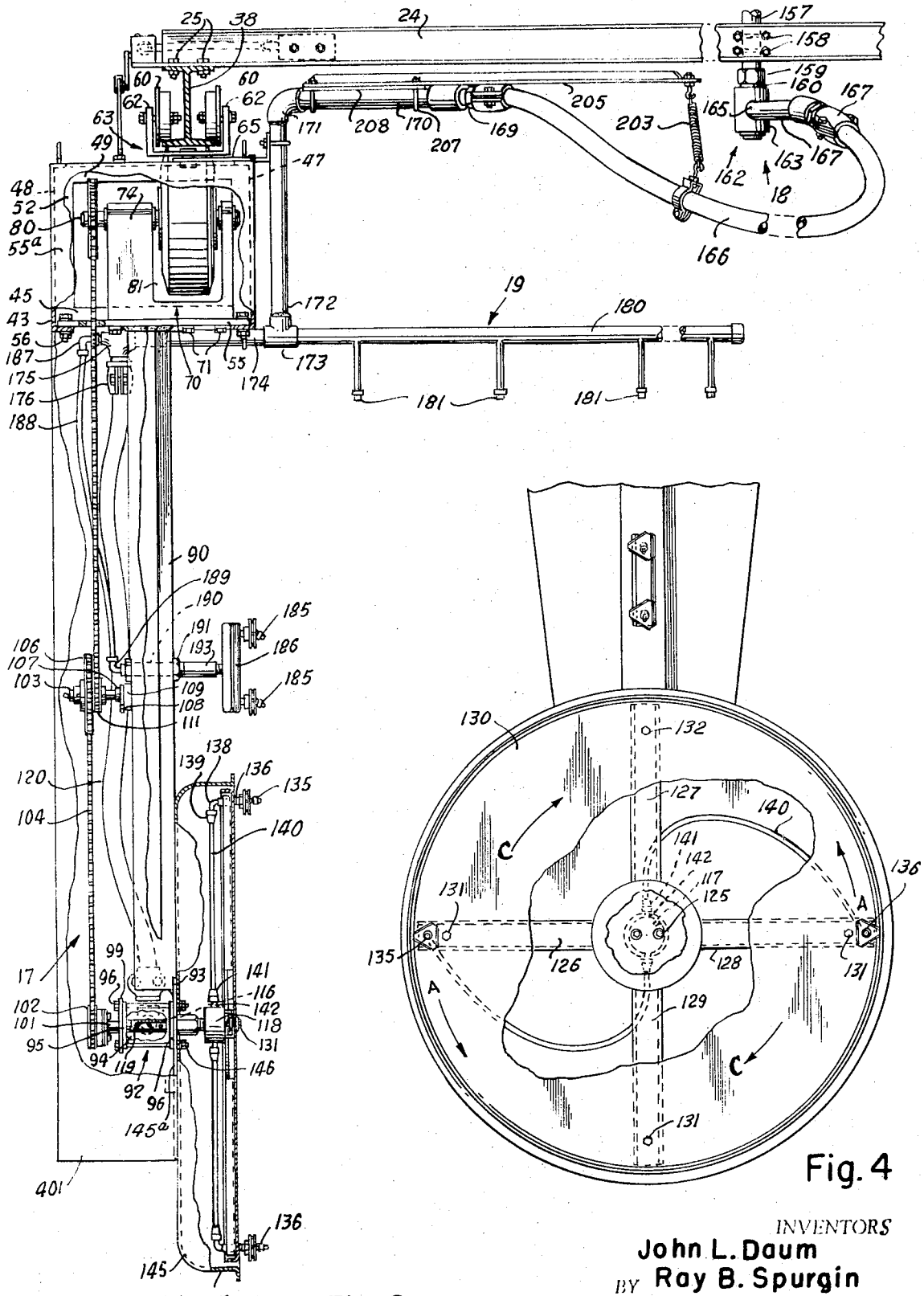

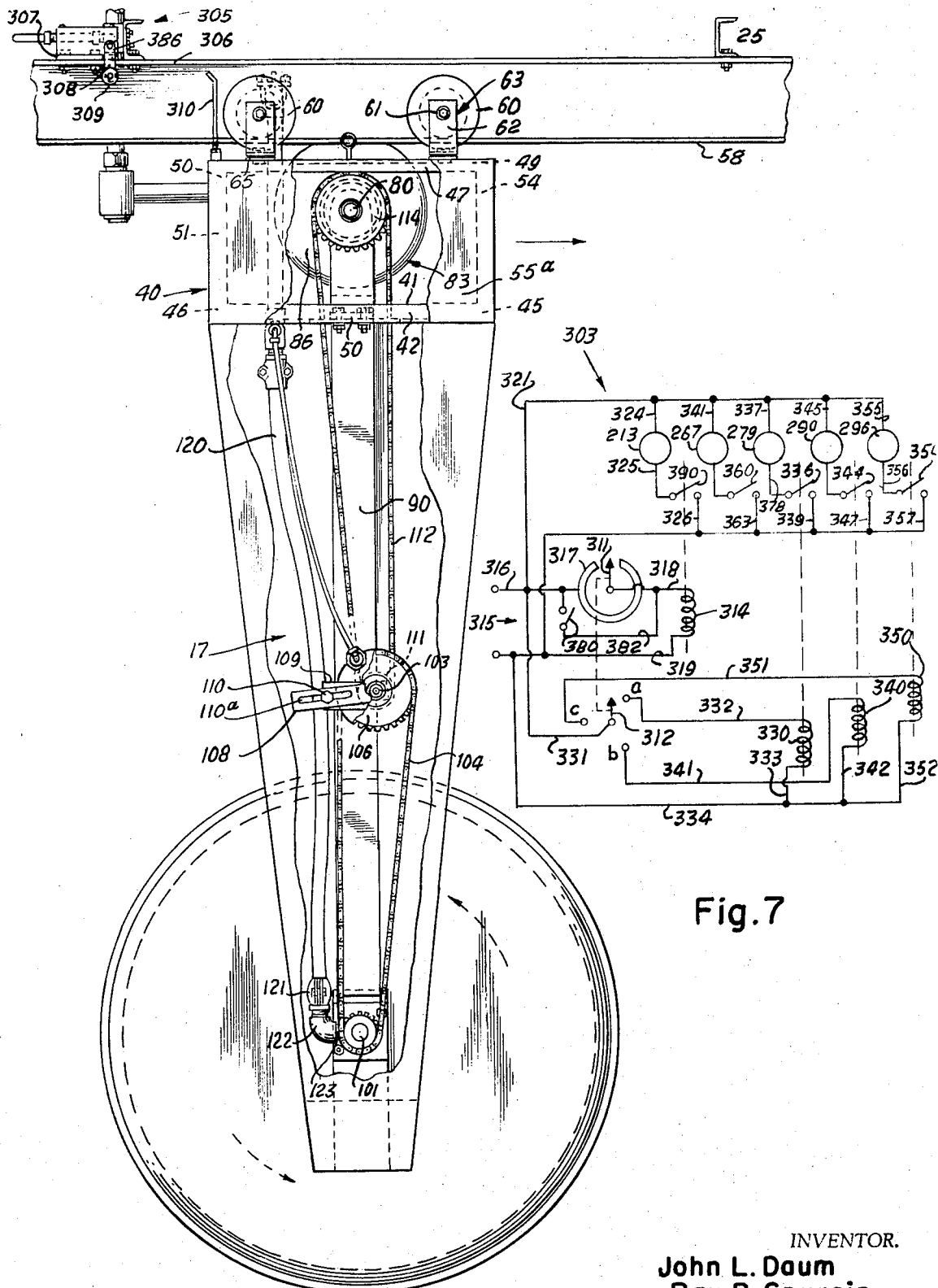

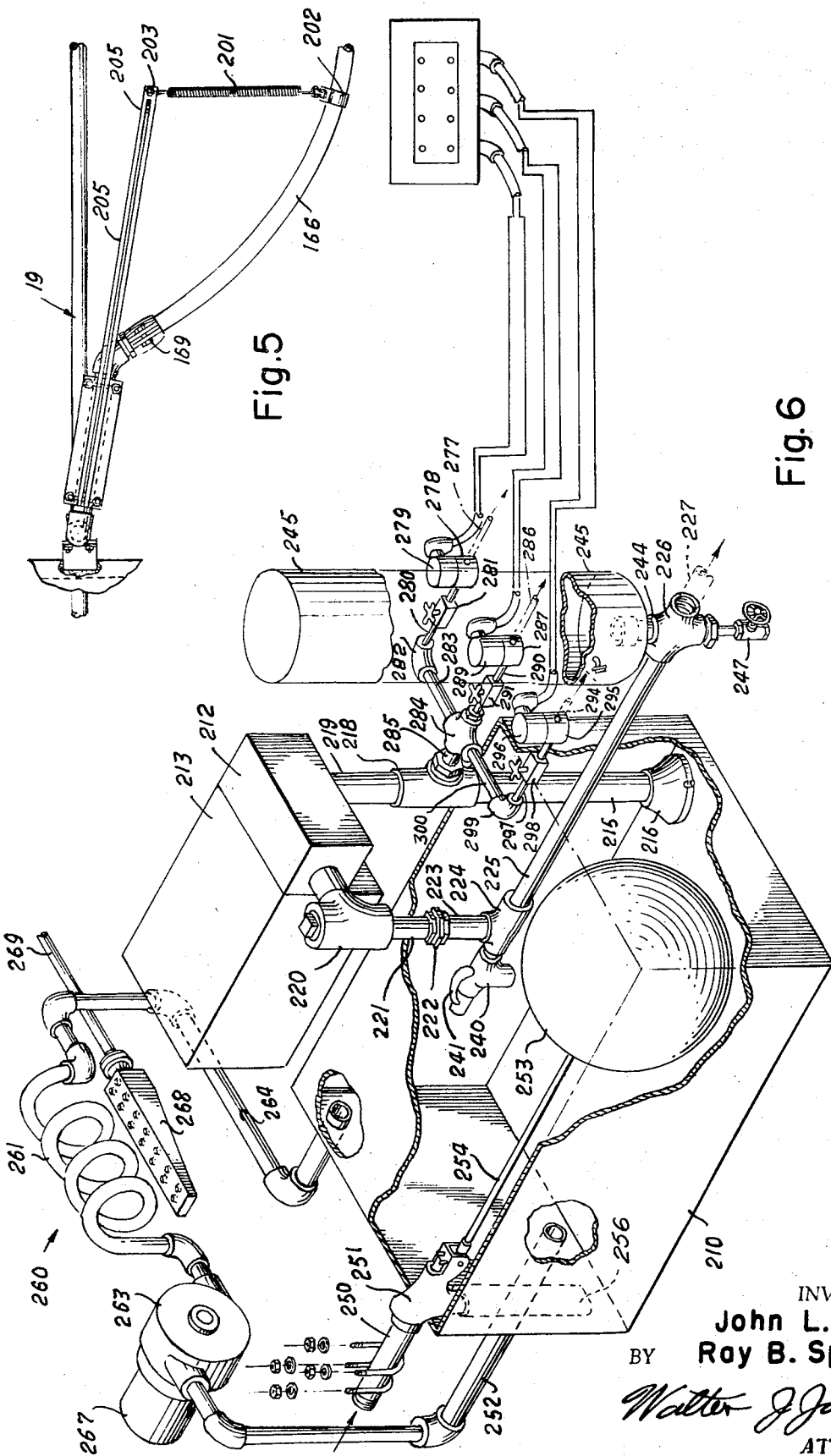

VEHICLE WASHING APPARATUS

This invention relates to washing apparatus and more particularly to an apparatus for washing vehicles.

An object of this invention is to provide a new and improved washing apparatus for washing vehicles with wash liquids and then rising the vehicle with a rinse liquid.

Another object is to provide a vehicle washing apparatus having a nozzle assembly which is rotatable about a substantially horizontal axis and is movable in a substantially oblong path about the vehicle, wherein the nozzle assembly directs a plurality of sprays of liquid which are moving rapidly about the horizontal axis onto the vehicle to subject the vehicle during successive movements of the nozzle assembly about the track to successively different liquids.

Still another object is to provide a new and improved vehicle washing apparatus having an oblong track below and within which the vehicle to be washed is positionable, a carriage mounted for movement on the track and about the vehicle, a nozzle assembly mounted on the carriage for directing sprays of liquid onto the surfaces of the vehicle as the carriage moves thereabout, and drive means mounted on the carriage and engageable with the track and driven by the reaction force of the water being sprayed by the nozzle assembly for moving the carriage about the track.

A further object is to provide a vehicle washing apparatus wherein the rotatable nozzle assembly directs sprays of liquid at the vertical surfaces of the vehicle and wherein a horizontally extending spray head mechanism is mounted on the carriage for directing sprays of liquid downwardly on upwardly facing surfaces of the vehicle as the carriage moves about the vehicle.

A still further object is to provide a new and improved means for driving a carriage on an overhead track which is driven by the reaction force of the liquids being sprayed by a rotatable nozzle assembly.

Additional objects and advantages of the invention will be readily apparent from the reading of the following description of a device constructed in accordance with the invention, and reference to the accompanying drawings thereof, wherein:

FIG. 2 is a vertical, partly sectional side view with some parts broken away, showing the carriage of the vehicle washing apparatus;

FIG. 3 is a vertical rear view, with some parts broken away of the carriage;

FIG. 4 is a fragmentary front view, with parts broken away, of the rotatable assembly;

FIG. 5 is a fragmentary view of the means for supporting a flexible conduit of the apparatus;

FIG. 6 is a fragmentary perspective view, with some parts broken away, of the liquid distribution system of the washing apparatus; and, FIG. 7 is a schematic illustration of an electric control circuit of the apparatus.

Figure 1:
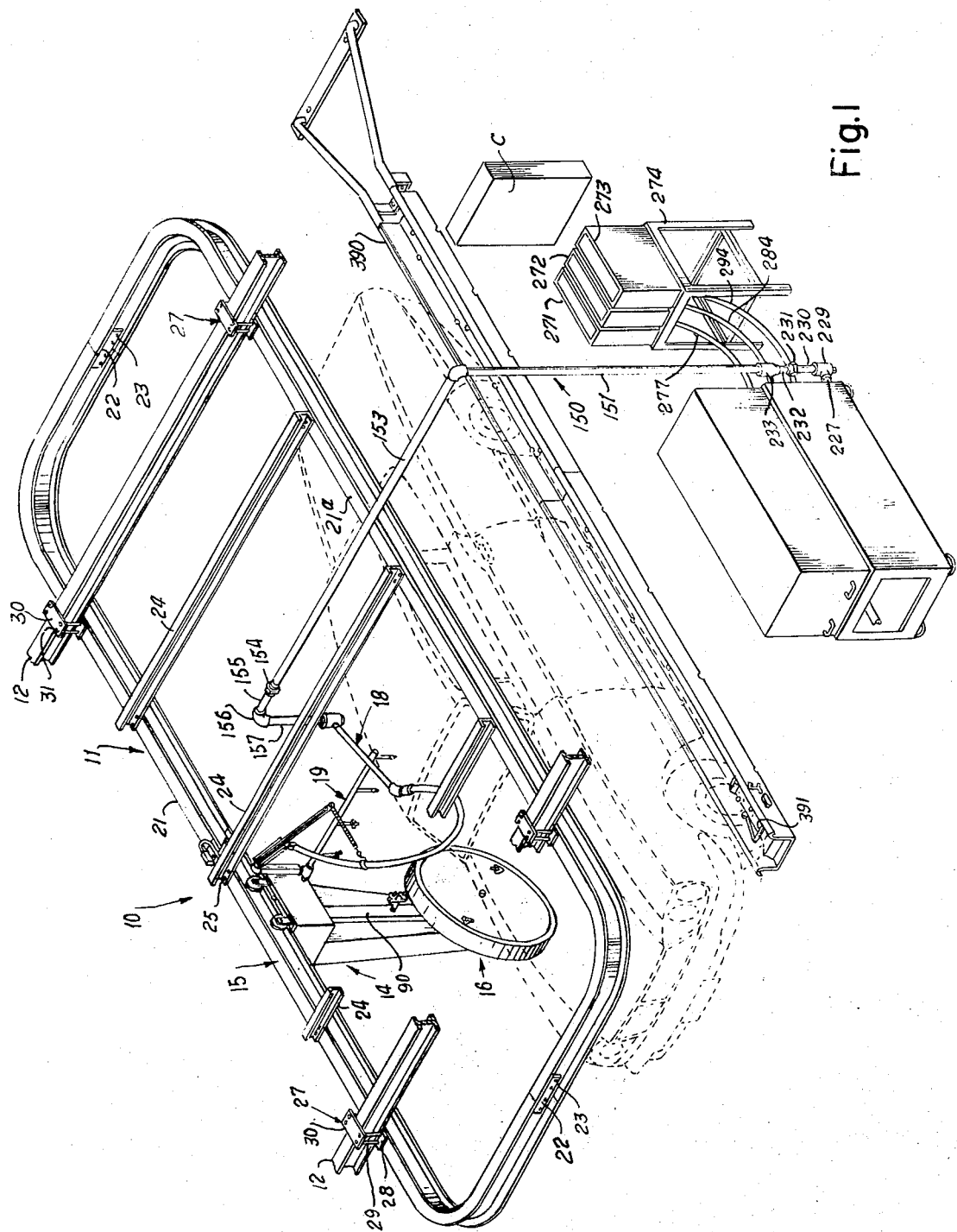
FIG. 1 is perspective view with some parts broken away of the vehicle washing apparatus embodying the invention.

Referring now to the drawings, the vehicle washing apparatus 10 embodying the invention includes a track assembly 11 which is securable to transverse overhead building or support structures, such as the I-beams 12, a carriage 14 mounted for movement about the track 15 of the track assembly, a rotatable nozzle assembly 16 mounted on the carriage for directing sprays of wash or rinse liquids at vertical surfaces of a vehicle positioned below the track as the carriage moves around the track, a drive assembly 17 driven by the rotatable nozzle assembly for moving the carriage about the track, and a swivel and conduit assembly 18 for delivering liquids under pressure to the rotatable nozzle assembly and to a horizontal spray head 19 mounted on the carriage.

The track 15 includes a pair of substantially U-shaped track sections 21 and 21a which are rigidly secured to one another by tie straps 22 which overlap adjacent ends of the track sections and are secured thereto by bolts 23. The track sections are also secured to one another by longitudinally spaced transverse channel members 24 of the track assembly which may be secured to the track sections in a suitable manner, as by bolts 25.

The track assembly is secured to the overhead I-beams 12 by clamp assemblies 27 which may comprise plates 28, rigidly secured to the top flanges of the track sections in any suitable manner as by welding, having threaded studs 29 which extend upwardly through suitable apertures in plates 30 which extend above the support I-beams and nuts 31 threaded on the studs.

It will be apparent that the outer ends of support I-beams 12 may either be secured to vertical columns extending from the floor or to some other support structure of a building.

The carriage includes an upper housing 40 having a lower horizontal rectangular frame 41 formed of vertical angle members 42, 43, 45, and 46, and an upper horizontal rectangular frame similarly formed of four angle members 47, 48, 49, and 50. The two frames are joined at their four corners by vertical corner angle members 51, 52, 53, and 54. It will be apparent that the angle members of which the frames and the corner members may be welded to one another to form a very rigid structure. The frame may be provided with relatively thin metal vertical walls 55a.

The bottom of the housing is closed by a mount plate 55 which rests on the inturned horizontal flanges of the angle members of the lower frame and is rigidly secured thereto by bolts 56.

The carriage is movable supported on the bottom horizontal flange 58 of the track 15 by means of four flange rollers 60 rotatably mounted on shafts 61 mounted on the vertical legs 62 of bifurcated brackets 63 rotatably mounted on bars 65, welded to an angle member of the upper horizontal frame.

It will be apparent that due to this rotatable mounting of the brackets 63, the carriage may move about the rounded corners of the track 15 without the rollers hindering the movement of the carriage on the track.

The carriage is provided with a bearing block 70 rigidly secured, as by bolts 71, to the mount plate 55. The bearing block has two spaced upwardly extending posts 74 and 75 provided with suitable bearings in which is rotatably supported a driven shaft 80 which extends through the upwardly opening recess 81 defined by the posts and on which is rigidly mounted a wheel 85 having a pneumatic tire 86. The peripheral surface of the tire 86 yieldably engages the bottom horizontal surface of the bottom flange 58 of the track so that, as the shaft is rotated in a manner to be described below, the driving engagement of the tire with the track causes the carriage to move about the track.

The nozzle assembly 16 mounted on the lower end of the vertical support member 90 includes a manifold 92 mounted on a bracket 93 rigidly secured to and depending from the lower end portion of the vertical support member. The manifold includes a tubular member 94 closed at both ends by end plates 95 and 96 which are welded thereto and which is secured to the bracket 93 by means of bolts 97 which extend through aligned apertures in a mount plate 99, the end plates 95 and 96, and the bracket 93. The mount plate, the end plates and the bracket are provided with aligned apertures through which a drive shaft 101 extends rotatably. Seal means (not shown) are provided between the drive shaft and the end plates 95 and 96 to seal therebetween at the appertures thereof through which the shaft extends.

The drive shaft 101 at its outer end is provided with a sprocket 102 which is connected to an intermediate shaft 103 by a chain 104 which extends about the small sprocket 102 and a large sprocket 106 rigidly mounted on the intermediate shaft. It will be apparent of course since the sprocket 102 is of smaller diameter than the sprocket 106, that the two sprockets and the chain constitute a speed reducing transmission. The shaft 103 is rotatably mounted on the vertical post member by means of a bearing block 107 rigidly mounted on a bar 108 adjustably secured to a bracket 109, welded to the support member 90, by a bolt 110 which extends through an elongate slot 110a of the bar into a threaded bore of the bracket 109.

The shaft 103 in turn is connected to the shaft 80 by means of the second speed reducing transmission which includes a sprocket 111 rigidly secured to the intermediate shaft 103, a chain 112 which extends about the small sprocket 111 and a large sprocket 114 rigidly secured to the shaft 80. It will be apparent that since the drive shaft 101 is connected to the shaft 80 by two speed reducing transmissions, that the wheel 85 will be rotated at a much slower rate than the shaft 101.

The shaft 101 has an internal longitudinal passage 116 which is closed at its outer end and opens at it inner end to a chamber 117 of a manifold 118 in which the inner end of the shaft 191 is threaded. The shaft is provided with one or more ports 119 which open to the shaft 101 so that liquid under pressure delivered to the interior of the chamber by a conduit means which includes a flexible hose 120, a connector fitting 121, an elbow 122 and a nipple 123, which is threaded in the elbow 122 and in an appropriate radial aperture of the tubular member 94 of the manifold 92, will flow from the manifold 92 through the ports 119 into the shaft passage 116 and thence to the chamber 117 of the manifold 118.

The manifold 118 has rigidly secured thereto a mount plate 124 by means of bolts 125 which extend through apertures in the mount plate into suitable threaded bores of the manifold 118. The mount plate has a plurality of channel members 126, 127, 128 and 129 rigidly secured thereto as by welding and which extend radially divergently outwardly therefrom. A disc 130 in turn is secured to the channel members by means of bolts 131 which extend through suitable apertures in the disc and the webs of the channel members.

A pair of spray nozzles 135 and 136 are mounted by suitable fittings 136 to the disc 130 and to the channel members 127 and 128. Liquid from the chamber 117 of the manifold 118 is delivered to each of the spray nozzles by conduit means which includes a tube 138, a connector 139, a conduit 140, a connector 141 and a nipple 142 threaded in a suitable radial aperture of the manifold 118.

It will be apparent therefore that the liquid under pressure delivered from the conduit 120 through the manifold 92 and the longitudinal passage of the shaft 101 to the manifold 118, flows therefrom to the spray nozzles 135 and 136 which are adjustable to cause the sprays of liquid issuing therefrom in opposite directions as, denoted by the arrows A in FIG. 4, to cause the disc 130 and manifold 118 and therefore the shaft 101 to rotate in the direction indicated by the arrow C due to the reaction force of the water being ejected from the nozzles.

A circular shield 145 is secured to a plate 145a depending from the vertical support 90 by bolts 146 and has an annular peripheral flange 147 which extends forwardly to and about the disc 130.

Liquid under pressure is supplied to the nozzle assembly 16 through a main supply conduit 150 which includes a vertical pipe 151 disposed to one side of the track, an elbow 152, a horizontal pipe 153 which extends over the track, a connector 154, a nipple 155, an elbow 157 and a vertical pipe 157 which is rigidly secured by U-bolts 158 to the middle transverse member 24 of the track assembly. The lower end of the pipe is connected by a suitable connector 159 to the stationary member 160 of a rotary union 162. The rotary union includes a rotary member 163 which is rotatable about the longitudinal axis of its stationary member 160 whose interior is in communication with ports in the center portion of the stationary member 160. An output conduit or pipe 165 of the rotary union member 163 is connected to one end of a flexible hose 166 by a connector fitting 167.

The other end of the flexible hose is connected by a connector assembly 169 to the inner end of a pipe 170, whose other end is connected to the upper end of the flexible conduit 120 by means of an elbow 171, a vertical pipe 172, a T-fitting 173, a pipe 174, a T-coupling 175 and a coupling 176. It will thus be apparent that the rotary union or swivel 162 permits the carriage to move about the track 15 while providing for flow of liquids under pressure from the main supply conduit means 150 to the flexible conduit 120 and therefore to the rotary nozzle assembly 16.

The horizontal spray head mechanism 19 includes a horizontal pipe 180 whose outer end is connected to the T-coupling 173 and which is provided with a plurality of longitudinally spaced downwardly directed nozzles 181 through which liquid under pressure is sprayed downwardly on upwardly facing surfaces of a vehicle.

A pair of auxiliary nozzles 185 are adjustably mounted on a manifold 186 to which liquid under pressure is supplied from the T-coupling 175 by an elbow connector 187, flexible conduit 188, an elbow connector 189, a nipple 190 which extends through aligned apertures in the side walls of the vertical support 90 to which it is secured by suitable nuts 191 threaded thereon, and a nipple 193.

It will be apparent that the nozzles 185 are preferably of the adjustable type so that the sprays of liquid therefrom may be directed at the side surfaces of the vehicle which are not subjected to sprays of liquid from the nozzles of the rotatable nozzle assembly 16.

The flexible hose 166 is yieldably supported in an upper position to keep it from contacting the top surfaces of the vehicle by a spring 201 whose lower end is secured to a clamp 202 secured to the hose and whose upper end is connected by eye bolt 203 to the inner end of T-member 205. The T-member extends over the horizontal pipe 170 and is rigidly secured thereto by means of U-bolts 207 whose shanks extend through apertures in a spacer bar 208 interposed between the horizontal flange of the T-member and the pipe 160 and secured as by welding to the T-member.

Fluid under pressure is delivered to the lower end of the supply conduit 150 from a reservoir tank 210 by a suitable pump 212 driven by an electric motor 213. The pump and the motor are mounted on top of the tank 210 in any suitable manner with the inlet pipe 215 of the pump opening to the tank adjacent its bottom through a suitable strainer 216. The upper end of the inlet pipe 215 is connected to the inlet of the pump by T-coupling 218 and nipple 219. The outlet of the pump is connected to the lower end of the pipe 151 by a T-coupling 220, a nipple 221, a coupling 222, a nipple 223, a T-coupling 2224, a pipe 225, a four way coupling 226, a nipple 227, aT-coupling 229, a nipple 230, a connector 231, a nipple 232, and a coupling 233.

A pressure relief safety pop off valve 240 is connected to one end of the T-coupling 224 and has a handle 241 which when actuated permits water to drain from the pipe 225 back into the tank 210. One part of the four-way coupling 226 is connected by a nipple 244 to the lower end of a surge tank 245 to minimize surges in the pressure of the liquid being delivered to the pipe 151 by the pump, as at the initiation of operation of the motor 213. A drain valve 247 may be connected to a downwardly opening port of the four way coupling and be used to drain water from the surge tank and of course the pipe 225.

Water from a supply source, such as a city water main system, is delivered to the tank 210 through a pipe 250 having a valve 251 for preventing flow of the water into the tank when the level of water in the tank exceeds a predetermined level and for permitting flow of water into the tank when it drops below the predetermined level. The valve 251 may be any suitable commercially available valve which is controlled by a float 253 mounted on the end of a rod 254 pivotally secured to the housing of the valve and operably associated with the valve for opening the valve when the water level drops below the predetermined level and for closing the valve when the water level tends to rise above the predetermined level and for closing the valve when the water level rises to the predetermined level.

In order to reduce splashing of the water in the tank, the outlet of the valve 251 may be provided with a conduit 256 which extends downwardly therefrom and opens to the tank adjacent its bottom.

The water in the tank may be heated by a heater 260 which includes the usual coil 261, the intake or upstream end of which is connected to the lower end of the tank by conduit means in which a pump 263 is connected and whose other outlet end is connected to the upper end of the chamber by a conduit means 264. The pump is preferably driven by an electric motor 267. A gas burner 268 provided with appropriate controls (not shown) may be employed to heat the water as it passes through the heating coil 261. Fuel gas is supplied to the burner through a gas supply pipe 269.

The wasing apparatus includes a plurality of tanks, in this case three tanks, 271, 272, and 273, in which active agents such as a solvent, a detergent, and a wax may be stored and which may be intoduced into the water being pumped from the tank by the pump 212 to form a solution therewith. The tanks are mounted on a suitable stand 274.

The tank 271 is connected to the T-coupling 218 through a conduit 277, a valve 278 which is operated by a solenoid 279, a pipe 280 in which is connected a manually operable meter and shut-off valve 281, of the needle valve type, an elbow 282, a pipe 283, a four way coupling 284.

The tank 272 is similarly connected to the T-coupling 218 by a conduit 286, a valve 287 which is operated by a solenoid 289, a pipe 290 in which is connected a manually operated meter and shut-off valve 291, a four-way coupling 284, and the nipple 285.

The tank 273 is connected to the T-coupling 218 by a conduit 294, a valve 295 operated by a solenoid valve 296, a conduit 297 in which a manually operated meter and shut-off valve 298 is connected, an elbow 299, a nipple 300, the four-way coupling 284, and the nipple 285.

It will be apparent that when the manual shut-off valve and the solenoid valve associated with a particular tank, for example, the shut-off valve 281 and the valve 278 of the tank 271, and the pump 212 is operating, liquid from the tank 271 will flow both by gravity and also by Venturi action into the water flowing upwardly through the T-coupling 218 into the inlet of the pump 212 and the liquid from the tank 271 is thoroughly mixed with or dissolved in the water in passing through the pump 212 and then through the conduit means 150 to the sprayhead mechanism 19, the rotary nozzle assembly 16 and the auxiliary nozzles 185.

Operation of the pump 212 and the solenoids 279, 289, and 296 is controlled by any suitable control circuit which will cause the valve 278 to be open during the first complete movement of the carriage about the track so that during the first revolution the vehicle is subjected to sprays of a solution of water and the particular active agent stored in the tank 271, such, for example, an agent which will help to dissolve grease adhering to the outer surfaces of the vehicle; which will cause the valve 287 to be open during the second complete movement of the carriage about the vehicle so that the vehicle is then subjected to sprays of a second solution during the second movement of the carriage, such second solution having a different active agent, for example, a detergent in solution with the water; and which will cause the valve 295 to be open during the third and final movement of the carriage about the track to subject the vehicle to a spray containing a rinse solution which may include another active ingredient from the tank 273, such as one which lowers the surface tension of the rinse water to prevent droplets of water from adhering to and drying on the outer surfaces of the vehicle or a wax so that the third solution not only rinses off the outer surfaces of the vehicle but also deposits a coating or layer of wax thereon.

Such control circuit may be the control circuit 303 illustrated in FIG. 7 which includes a two contact stepping switch 305 which may be mounted on the top flange 306 of the track by means of bolts 307 and have an operator arm 308 which extends downwardly of the top flange and is provided with a roller 309 which is engageable by an actuator arm 310 rigidly secured to the top frame member 50 of the carriage. The switch 305 may be of any suitable commercially available type and have two contacts 311 and 312 which are movable in step by step fashion through three positions. The contact 311 when moved to an operative position connects the relay winding 314 across an input circuit 315 by means of the conductors 316, the stationary contact 317 which is in the form of a segment of a circle of approximately 340° and the conductors 318 and 319. The relay winding 314 when energized causes its contact 320 to move to closed position to connect the pump motor 213 across the input circuit 316 by means of the conductors 316, 321, 328, 325, 326, 327 and 319.

The contact 312 when moved from its initial position, FIG. 7, engages a contact $a$ and connects a relay winding 330 across the input circuit by means of the conductors 316, 331, 332, 333, and 334.

The relay winding 330 when energized moves its movable contact 336 to its closed position to connect the solenoid 279, which when energized opens the normally closed valve 278, across the input circuit through the conductors 316, 321, 337, 338, 339, 327, and 316.

When the actuating arm 308 is again actuated and moves the contact 312 to its second operative position wherein it engages its stationary contact $b$ a relay winding 340 is connected thereby across the input circuit through the conductors 316, 331, 341, 342, and 334. When the relay winding 340 is energized and moves its contact 344 to its closed position, it connects the solenoid 289 across the input circuit through the conductors 316, 321, 345, 346, 347, 327, 316, and 319. The solenoid 340 when energized opens the normally closed valve 287.

Finally, when the contact 312 is moved to its third operative position wherein it engages its stationary contact $c$, it connects a relay winding 350 across the input circuit by means of the conductors 316, 331, 351, 352, 334, and 319. When the relay winding 350 is energized, it moves its movable contact 354 to its closed position wherein it connects the solenoid 296 of the normally closed valve 295 across the input circuit by means of the conductors 316, 321, 355, 356, 357, 327, and 319. When the solenoid 296 is energized it opens the normally closed valve 295.

The motor 267 of the circulating pump 263 which moves the water from the tank through the heating coil 261 and back to the tank is connectible across the input circuit by a manually operable switch 360 when it is moved to closed position, the motor 267 then being connected across the input circuit by means of the conductors 316, 321, 361, and 362, the switch 360 and the conductors 363, 327, and 319.

A switch 380 is provided for connecting the solenoid winding 314 across the input circuit 315. The switch 380 may be a manually operable switch or a switch of a coin operated mechanism which is closed for a very short period of time when a coin is deposited in such coin operated mechanism. The switch 380 when closed connects the relay winding 314 across the input circuit by means of the conductors 316, 381, 382, 318, and 319.

When the carriage is in its initial or starting position, the actuator arm 310 is engaged with the roller 309 and is holding the switch operator arm 308 in a position pivoted in a counter clockwise manner, as seen in FIG. 3, about its axis 386, so that the relay contacts 311 and 312 are held in the position illustrated in 312 wherein none of the relay windings are connected across the input circuit. If it is now desired to wash a vehicle with hot water, the burner 268 is ignited, and the motor 267 is energized by the closure of the manual switch 360 to cause the water in the tank to be circulated by the pump 263 through the heating coil. The tank 210 is of such capacity that the water therein with the water which is introduced thereinto from the pressurized water supply, such as a city water supply system, will be sufficient to provide water at the high rate pumped therefrom by the pump 212 during the operation of the apparatus during the washing of each vehicle even though such city water supply may be of relatively low pressure and thus be delivered into the tank at a lower rate than it is pumped from the tank by the pump 212.

The vehicle to be washed is then driven with its left wheels through a guide chute or channel 390 until its left front wheel engages a suitable arresting device 391 which will tend to stop forward movement of the vehicle and thus signal the driver that he is in proper position within and below the track. The switch 380 is then closed, the relay winding 314 is energized and the motor 213 of the pump 212 is energized. As a result, water under pressure is delivered from the tank to the rotatable nozzle assembly 16 as well as the sprayhead mechanism 19 and the auxiliary nozzles 385. The reaction forces of the water being sprayed by the nozzles on the nozzles and therefore on the disc 130 and the shaft 101 now cause the shaft 101 to rotate and the wheel 85 is also rotated. The rotation of the wheel 85 now causes the carriage to move in the direction indicated by the arrow in FIG. 3. The actuator arm 310 disengages from the roller 309 and, as the operator arm 308 moves to its normal non-actuated position illustrated in FIG. 3, the contacts 311 and 312 are rotated through a small angle to positions wherein the contact 311 engages its stationary contact 317 and the contact 312 engages its stationary contact $a$. As a result, upon a very short movement of the carriage, the relay winding 330 is energized thus causing the solenoid 279 to be energized and, since this causes the valve 278 to open, liquid from the tank 271 is mixed with the water being pumped from the tank and as the movement of the carriage continues, the vehicle will be sprayed with ta first solution of water and the liquid from the tank 271.

The sprayhead 19 extends over more than half the width of the automobile so that all surfaces of the automobile are sprayed with the first solution as the carriage moves about the track.

When the carriage again moves to the position where the arm 310 again engages the roller 309 of the operator arm 308 of the switch 305 and moves it upwardly and then allows it to move back to its position illustrated in FIG. 3, the contacts 311 and 312 are moved through 120°. As a result, the relay winding 330 is disconnected from across the input circuit 315 thus causing the valve 278 to close and thereafter as the contact 312 engages its stationary contact b, the relay winding 340 is energized causing the solenoid 289 to be energized and the valve 287 to be opened. During this movement of contact 311 through 120 degrees, the pump motor 213 remains energized since the contact 311 remains in engagement with its stationary contact 317, the operation of the pump 212 is not interrupted and the carriage continues to move about the track.

As a result, during the next movement of the carriage about the track, the outer surfaces of the vehicle are subjected to sprays of a second solution of another agent, such as a detergent, from the tank 272 and the water being pumped from the tank 210.

As the carriage completes its second movement about the track 15 and the actuator arm 310 again engages the roller 309 of the operator arm 308 of the switch 305 and then disengages therefrom, the contacts 311 and 312 are again moved through 120 degrees. During this second operation of the switch 305, the contact 311 continues to remain in engagement with its stationary contact 317 while the contact 312 moves out of engagement with its stationary contact b. As a result, the relay winding 340 is disconnected from across the input circuit 315 thus causing the valve 287 to close and thereafter as the contact 312 engages its stationary contact c, the relay winding 358 is energized causing the solenoid 296 to be energized and the valve 295 to be open. The vehicle will be subjected to sprays of the third solution of the water and the liquid in the third tank 273, which as was explained above may be a wax or a surfactant which reduces the surface tension of the water, during the third movement of the carriage about the track.

As the carriage moves toward the end of its third movement about the track, the actuator arm 310 will again engage the roller 309 of the operator arm 308 of the switch 305 and the contacts 311 and 312 will again be moved less than 120 degrees since, as the contact 311 moves out of engagement with its stationary contact 317, the relay winding 314 is disconnected from the input circuit 315, pump motor 213 is de-energized and the movement of the carriage on the track stops as the operation of the pump 212 stops. The actuator arm is such configuration that it will remain in engagement with the actuator arm with the roller 309 holding it in its upper position, even though the carriage may move some small distance on the track after the pump motor 213 is de-energized due to its momentum. As a result, the contacts 311 and 312 are now again in the non-actuated or inoperative positions illustrated in FIG. 7 and will remain in this position until the switch 380 is again closed momentarily.

It will be apparent that as soon as the pump 212 is placed in operation, the level of the water in the tank 212 tends to drop below the predetermined level and the float 253 is then effective to open the inlet valve 251 so that the water from the city water supply system flows into the tank as water is being pumped therefrom by the pump 212. As was explained above, even though the pump 212 pumps the water from the tank at a faster rate than it is being introduced into the tank from the water supply pipe 250, the tank 210 is of sufficient capacity that water is always present in the tank 210 during the three consecutive movements of the carriage about the track 15.

After the cessation of one cycle of operation of the washing apparatus and while the washed vehicle is being driven from beneath the track and a succeeding vehicle to be washed is being driven into position within and below the track 15, the tank 210 again fills to the predetermined level and the float is then effective to close the valve 251. The various controls of the washing apparatus 10 may be mounted in a cabinet or console C at one side of the track.

While a particular control circuit for controlling the operation of the pump motor 213 and for causing the sequential energization of the solenoids which operate the valves 278, 287, and 295 has been illustrated and described, it will be apparent other control circuits responsive to the movement of the carriage about the track may be used. For example, the switching circuit illustrated in the patent to John L. Daum and Ray B. Spurgin, U.S. Pat. No. 3,400,727, issued Sept. 10, 1968, which employs three switches mounted on the track and operated by the carriage may be adapted to control the operation of the pump motor and the solenoids.

If desired, the number of trips of the carriage around the track and about the vehicle may be increased. For example, during a fourth trip of the carriage about the vehicle, a plain water rinse may be sprayed on the vehicle.

It will now be seen that a new and improved vehicle washing apparatus has been illustrated and described which employs a pump to move liquid from a reservoir and deliver it under high pressure to the spray head mechanism 19, the rotatable nozzle assembly 16, and the auxiliary nozzles 85 so that high velocity sprays of liquid are directed at the vehicle to be washed and the dirt adhering to the vehicle is not only washed off due to the dissolution of the dirt in the wash liquids which are sprayed thereon but also due to the mechanical force with which the sprays impinge on the surfaces of the vehicle.

It will further be seen that the reaction force of the water issuing from the nozzles 135 and 136 of the rotatable nozzle assembly 116 is used to drive the wheel 85, the rotatable nozzle assembly being connected by a speed reducing transmission means to the drive shaft of the wheel.

It will further be seen that the tension on the chains 104 and 112 of the speed reducing transmission means can be easily adjusted due to the mounting of the bar 108 on the bracket 109 by means of the slot 110a and bolt 110 so that the bar 108 may be moved longitudinally relative to the bolt and also be pivoted relative thereto.

It will further be seen that a shroud or cover 401 may be connected, as by screws or the like, to the vertical support 90 to enclose the speed reducing transmission.

It will further be seen that due to the provision of a pump for delivering liquid to the rotatable nozzle assembly at a pressure much higher than that of a city water system and of a speed reducing transmission between the rotatable nozzle assembly and the wheel 85, the velocity with which the sprays from the nozzles 135 and 136 impinge on the surfaces of the automobile may be relatively high while at the same time the reactive forces exerted on the nozzle assembly by the liquid being sprayed are effective to drive the wheel 85 and move the carriage about the track.

It will further be seen that the means for driving the carriage is of simple design and compact and that since the carriage is mounted on the track below the top surface thereof and the wheel 85 engages the bottom surface of the track, connection of the track to an overhead support structure, such as the I-beams 12, is greatly facilitated.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A vehicle washing apparatus including: an overhead substantially rectangular track means; a carriage mounted for movement about said track means; a rotatable nozzle assembly mounted on said carriage below said track assembly, said nozzle assembly including a plurality of nozzles below said track means as said carriage moves about said track means; means for supplying liquid under pressure to said nozzles which issues as sprays from said nozzles and the reaction forces of the sprays on said nozzles causing rotation of said nozzle assembly; a drive wheel rotatably mounted on said carriage and engaging said track means; and transmission means connecting said nozzle assembly to said wheel for rotating said wheel when liquid under pressure is supplied to said nozzles and said nozzle assembly is rotated and for causing the carriage to be moved about said track, said track means comprising a bottom flange having horizontal top and bottom surfaces, said carriage having roller means engageable with the top surface of said bottom flange for movably supporting said carriage on said flange, said drive wheel being rotatable about a horizontal axis and having a peripheral surface engaging the bottom surface of said bottom flange, said carriage having a vertical support means depending therefrom, said rotatable nozzle assembly being rotatably mounted on said support means at a location spaced downwardly of said drive wheel, said drive wheel and said rotatable nozzle assembly having first and second shafts, respectively, rotatable therewith, a speed reducing transmission connecting said shafts, said speed reducing transmission including a third shaft secured to said support means, first flexible means connecting said second shaft to said third shaft for causing said third shaft to rotate when said second shaft is rotated at a slower speed than said second shaft, and second flexible means connecting said third shaft to said first shaft for causing said first shaft to rotate when said third shaft is rotated at a slower speed than said third shaft.

* * * * *